United States Patent
Fishman et al.

(10) Patent No.: US 10,210,160 B2
(45) Date of Patent: Feb. 19, 2019

(54) COLLECTING DATA FROM DIFFERENT SOURCES

(75) Inventors: Alex Fishman, San Francisco, CA (US); Crx K. Chai, Oakland, CA (US)

(73) Assignee: OPENTV, INC., San Francisco, CA (US)

( * ) Notice: Subject to any disclaimer, the term of this patent is extended or adjusted under 35 U.S.C. 154(b) by 175 days.

(21) Appl. No.: 12/878,001

(22) Filed: Sep. 8, 2010

(65) Prior Publication Data
US 2012/0059825 A1    Mar. 8, 2012

Related U.S. Application Data (63) Continuation-in-part of application No. 12/877,034, filed on Sep. 7, 2010.

(51) Int. Cl.
| | |
|---|---|
| *G06F 17/30* | (2006.01) |
| *G06Q 10/00* | (2012.01) |
| *G06Q 30/00* | (2012.01) |
| *G06Q 30/02* | (2012.01) |
| *H04H 60/33* | (2008.01) |
| *H04H 60/65* | (2008.01) |

(52) U.S. Cl.
CPC .. *G06F 17/30053* (2013.01); *G06F 17/30867* (2013.01); *G06Q 10/00* (2013.01); *G06Q 30/00* (2013.01); *G06Q 30/02* (2013.01); *H04H 60/33* (2013.01); *H04H 60/65* (2013.01)

(58) Field of Classification Search
CPC ........ G06F 17/30053; G06F 17/30867; G06Q 10/00; H04H 60/33
USPC ...................................... 725/46, 47
See application file for complete search history.

(56) References Cited

U.S. PATENT DOCUMENTS

| | | | | |
|---|---|---|---|---|
| 5,798,785 | A * | 8/1998 | Hendricks | H04H 20/42 348/E5.002 |
| 6,795,826 | B2 * | 9/2004 | Flinn | G06F 17/30604 |
| 6,804,675 | B1 * | 10/2004 | Knight | G06F 17/30702 707/754 |
| 7,644,427 | B1 * | 1/2010 | Horvitz | H04H 60/37 725/13 |
| 8,108,341 | B2 | 1/2012 | Barsook et al. | |

(Continued)

FOREIGN PATENT DOCUMENTS

| | | |
|---|---|---|
| AU | 201101152 | 10/2011 |
| EP | 0262757 A2 | 4/1988 |

(Continued)

OTHER PUBLICATIONS

"U.S. Appl. No. 12/877,993 , Response filed Dec. 3, 2012 to Non Final Office Action dated Aug. 2, 2012", 17 pgs.

(Continued)

*Primary Examiner* — Nathan J Flynn
*Assistant Examiner* — Tung T Trinh
(74) *Attorney, Agent, or Firm* — Schwegman Lundberg & Woessner, P.A.

(57) ABSTRACT

A system for collecting data from different sources is described. In one example embodiment, the system obtains content-related data from a plurality of source computer systems, automatically identifies, based on the content-related data, content items having respective popularity values greater than a predetermined threshold value as popular content items, and automatically generates a list of popular content items based on the popular content items.

25 Claims, 6 Drawing Sheets

(56) References Cited

U.S. PATENT DOCUMENTS

| | | | | |
|---|---|---|---|---|
| 8,234,147 B2* | 7/2012 | Olejniczak | G06F 17/30864 | 705/26.1 |
| 8,286,206 B1* | 10/2012 | Aaron | H04N 21/252 | 725/46 |
| 8,402,031 B2* | 3/2013 | Govani | G06F 17/3053 | 707/723 |
| 8,515,975 B1* | 8/2013 | Federici | G06F 17/30554 | 707/750 |
| 8,677,235 B2* | 3/2014 | Chronister | G06F 17/30994 | 715/253 |
| 8,803,882 B2* | 8/2014 | Lam | G06F 17/30864 | 345/440 |
| 8,949,871 B2 | 2/2015 | Chai et al. | | |
| 9,699,503 B2* | 7/2017 | Fishman | H04N 21/252 | |
| 9,800,927 B2 | 10/2017 | Chai | | |
| 2002/0010625 A1* | 1/2002 | Smith | G06Q 30/02 | 705/14.52 |
| 2002/0011988 A1 | 1/2002 | Sai et al. | | |
| 2002/0053084 A1* | 5/2002 | Escobar | H04N 7/17318 | 725/47 |
| 2003/0037334 A1 | 2/2003 | Khoo et al. | | |
| 2003/0093790 A1* | 5/2003 | Logan | G06F 17/30265 | 725/38 |
| 2003/0172374 A1* | 9/2003 | Vinson | G06Q 30/02 | 725/9 |
| 2003/0217365 A1* | 11/2003 | Caputo | H04N 7/106 | 725/95 |
| 2003/0237093 A1 | 12/2003 | Marsh et al. | | |
| 2004/0054572 A1* | 3/2004 | Oldale | G06F 17/30699 | 706/1 |
| 2004/0056900 A1 | 3/2004 | Blume | | |
| 2005/0038717 A1* | 2/2005 | McQueen, III | G06Q 30/02 | 705/26.61 |
| 2005/0144499 A1 | 6/2005 | Narahara et al. | | |
| 2005/0160458 A1 | 7/2005 | Baumgartner | | |
| 2006/0008256 A1* | 1/2006 | Khedouri | G06F 17/30038 | 386/234 |
| 2006/0010464 A1* | 1/2006 | Azami | H04H 60/31 | 725/9 |
| 2006/0123448 A1* | 6/2006 | Ma | H04N 21/41407 | 725/51 |
| 2006/0200434 A1* | 9/2006 | Flinn | G06N 99/005 | 706/12 |
| 2006/0242554 A1* | 10/2006 | Gerace | G06F 17/30867 | 715/209 |
| 2006/0277098 A1* | 12/2006 | Chung | G06Q 30/02 | 705/14.22 |
| 2007/0011702 A1 | 1/2007 | Vaysman | | |
| 2007/0033607 A1 | 2/2007 | Bryan | | |
| 2007/0041705 A1* | 2/2007 | Bontempi | H04N 5/76 | 386/262 |
| 2007/0100824 A1* | 5/2007 | Richardson | G06F 17/30864 | |
| 2007/0136753 A1* | 6/2007 | Bovenschulte | H04H 60/31 | 725/46 |
| 2007/0157242 A1 | 7/2007 | Cordray et al. | | |
| 2007/0157248 A1 | 7/2007 | Ellis | | |
| 2008/0092173 A1* | 4/2008 | Shannon | H04N 5/44543 | 725/47 |
| 2008/0117202 A1* | 5/2008 | Martinez | G06F 17/30035 | 345/418 |
| 2008/0155588 A1* | 6/2008 | Roberts | G06Q 30/00 | 725/34 |
| 2008/0163059 A1 | 7/2008 | Craner | | |
| 2008/0178239 A1* | 7/2008 | Yampanis | H04L 41/5064 | 725/110 |
| 2008/0222106 A1* | 9/2008 | Rao | G06F 17/30696 | |
| 2008/0320517 A1 | 12/2008 | Beadle et al. | | |
| 2009/0006374 A1* | 1/2009 | Kim | G06F 17/30699 | |
| 2009/0031354 A1* | 1/2009 | Riley | H04N 7/165 | 725/46 |
| 2009/0037254 A1* | 2/2009 | Colando | G06Q 30/02 | 705/7.32 |
| 2009/0046101 A1* | 2/2009 | Askey | G06Q 30/02 | 345/470 |
| 2009/0052859 A1 | 2/2009 | Greenberger et al. | | |
| 2009/0060469 A1* | 3/2009 | Olague | H04N 7/17318 | 386/297 |
| 2009/0070185 A1* | 3/2009 | Farrelly | G06Q 20/123 | 705/14.4 |
| 2009/0083326 A1* | 3/2009 | Pelton | G06F 17/30029 | |
| 2009/0089433 A1* | 4/2009 | Kisel | H04L 67/1008 | 709/226 |
| 2009/0092183 A1* | 4/2009 | O'Hern | H04N 21/2407 | 375/240.01 |
| 2009/0100469 A1* | 4/2009 | Conradt | H04N 7/17318 | 725/46 |
| 2009/0144773 A1 | 6/2009 | Cavanaugh et al. | | |
| 2009/0150214 A1* | 6/2009 | Mohan | G06Q 30/02 | 705/14.52 |
| 2009/0150786 A1* | 6/2009 | Brown | G06F 17/30035 | 715/733 |
| 2009/0163183 A1* | 6/2009 | O'Donoghue | G06Q 30/02 | 455/414.1 |
| 2009/0164450 A1 | 6/2009 | Martinez et al. | | |
| 2009/0182725 A1* | 7/2009 | Govani | G06F 17/30864 | |
| 2009/0210902 A1 | 8/2009 | Slaney et al. | | |
| 2009/0217324 A1 | 8/2009 | Massimi | | |
| 2009/0249393 A1 | 10/2009 | Shelton et al. | | |
| 2009/0265359 A1 | 10/2009 | Barsook et al. | | |
| 2010/0042608 A1* | 2/2010 | Kane, Jr. | G06F 17/30867 | 707/732 |
| 2010/0058241 A1 | 3/2010 | Saijo et al. | | |
| 2010/0293034 A1* | 11/2010 | Olejniczak | G06F 17/30864 | 705/14.45 |
| 2011/0035707 A1 | 2/2011 | Kitayama | | |
| 2011/0060649 A1* | 3/2011 | Dunk | G06F 17/3002 | 705/14.53 |
| 2011/0145040 A1 | 6/2011 | Zahn et al. | | |
| 2011/0162008 A1* | 6/2011 | Aldrey | H04N 21/235 | 725/40 |
| 2011/0225290 A1* | 9/2011 | Kansal | H04L 67/1097 | 709/224 |
| 2011/0283304 A1* | 11/2011 | Roberts | H04H 60/46 | 725/9 |
| 2012/0060094 A1 | 3/2012 | Irwin et al. | | |
| 2012/0060176 A1 | 3/2012 | Chai et al. | | |
| 2012/0060195 A1 | 3/2012 | Fishman et al. | | |
| 2015/0121406 A1 | 4/2015 | Chai et al. | | |
| 2018/0020255 A1 | 1/2018 | Fishman et al. | | |
| 2018/0035161 A1 | 2/2018 | Fishman et al. | | |

FOREIGN PATENT DOCUMENTS

| | | |
|---|---|---|
| WO | WO-0232136 A2 | 4/2002 |
| WO | WO-2002032136 A2 | 4/2002 |
| WO | WO-2012033489 A1 | 3/2012 |
| WO | WO-2012033921 A1 | 3/2012 |

OTHER PUBLICATIONS

"U.S. Appl. No. 12/877,034, Non Final Office Action dated Aug. 10, 2012", 11 pgs.

"U.S. Appl. No. 12/877,034, Response filed Nov. 13, 2012 to Non Final Office Action dated Aug. 10, 2012", 11 pgs.

"U.S. Appl. No. 12/877,875, Non Final Office Action dated Nov. 6, 2012", 13 pgs.

"U.S. Appl. No. 12/877,993, Non Final Office Action dated Aug. 2, 2012", 26 pgs.

"International Application Serial No. PCT/US2011/50712, International Search Report dated Jan. 5, 2012", 2 pgs.

"International Application Serial No. PCT/US2011/50712, Written Opinion dated Jan. 5, 2012", 6 pgs.

"International Application Serial No. PCT/US2011/50839, International Search Report dated Dec. 30, 2011", 2 pgs.

"International Application Serial No. PCT/US2011/50839, Written Opinion dated Dec. 30, 2011", 4 pgs.

"U.S. Appl. No. 12/877,034, Examiner Interview Summary dated Jul. 24, 2013", 3 pgs.

(56) References Cited

OTHER PUBLICATIONS

"U.S. Appl. No. 12/877,034, Final Office Action dated Mar. 25, 2013", 14 pgs.
"U.S. Appl. No. 12/877,875 , Response filed Mar. 11, 2013 to Non Final Office Action dated Nov. 6, 2012", 10 pgs.
"U.S. Appl. No. 12/877,875, Advisory Action dated Aug. 2, 2013", 3 pgs.
"U.S. Appl. No. 12/877,875, Final Office Action dated Apr. 23, 2013", 12 pgs.
"U.S. Appl. No. 12/877,993, Final Office Action dated Mar. 15, 2013", 30 pgs.
"U.S. Appl. No. 12/877,993, Response filed Jul. 22, 2013 to Final Office Action dated Mar. 15, 2013", 17 pgs.
"International Application Serial No. PCT/US2011/50712, International Preliminary Report on Patentability dated Mar. 21, 2013", 8 pgs.
"International Application Serial No. PCT/US2011/50839, International Preliminary Report on Patentability dated Mar. 21, 2013", 6 pgs.
Chai, Crx K., "U.S. Appl. No. 12/877,875 / Smart Media Selection Based on Viewer User Preference", 11.
"U.S. Appl. No. 12/877,875, Non Final Office Action dated Apr. 15, 2014", 13 pgs.
"U.S. Appl. No. 12/877,875, Response filed Jul. 16, 2013 to Final Office Action dated Apr. 23, 2013", 11 pgs.
"Australian Application Serial No. 2011101152, Examination Report No. 1 dated May 6, 2013", 4 pgs.
"Australian Application Serial No. 2011101152, Response filed Sep. 17, 2013 to Examination Report No. 1 dated May 6, 2013", 13 pgs.
"Australian Application Serial No. 2011299234, Amendment filed Apr. 4, 2013", 11 pgs.
"U.S. Appl. No. 12/877,034, Non Final Office Action dated Oct. 1, 2013", 13 pgs.
"U.S. Appl. No. 12/877,034, Response filed Feb. 26, 2014 to Non Final Office Action dated Oct. 1, 2013", 13 lpgs.
"U.S. Appl. No. 12/877,034, Response filed Aug. 26, 2013 to Final Office Action dated Mar. 25, 2013", 12 pgs.
"U.S. Appl. No. 12/877,034, Appeal Brief filed Jun. 11, 2015", 21 pgs.
"U.S. Appl. No. 12/877,034, Appeal Decision dated Jan. 3, 2017", 10 pgs.
"U.S. Appl. No. 12/877,034, Decision on Pre-Appeal Brief Request dated Dec. 11, 2014", 2 pgs.
"U.S. Appl. No. 12/877,034, Final Office Action dated Jun. 13, 2014", 14 pgs.
"U.S. Appl. No. 12/877,034, Notice of Allowance dated Mar. 29, 2017", 9 pgs.
"U.S. Appl. No. 12/877,034, Pre-Appeal Brief Request filed Nov. 4, 2014", 5 pgs.
"U.S. Appl. No. 12/877,875, Notice of Allowance dated Sep. 17, 2014", 12 pgs.
"U.S. Appl. No. 12/877,875, Response filed Aug. 15, 2014 to Non Final Office Action dated Apr. 15, 2014", 12 pgs.
"U.S. Appl. No. 12/877,993, Advisory Action dated May 8, 2017", 9 pgs.
"U.S. Appl. No. 12/877,993, Appeal Brief filed Feb. 24, 2016", 20 pgs.
"U.S. Appl. No. 12/877,993, Final Office Action dated Jan. 28, 2015", 35 pgs.
"U.S. Appl. No. 12/877,993, Non Final Office Action dated Jun. 20, 2014", 31 pgs.
"U.S. Appl. No. 12/877,993, Response filed Oct. 14, 2014 to Non Final Office Action dated Jun. 20, 2014", 19 pgs.
"U.S. Appl. No. 14/588,871, Final Office Action dated Mar. 7, 2016", 12 pgs.
"U.S. Appl. No. 14/588,871, Final Office Action dated Mar. 31, 2017", 17 pgs.
"U.S. Appl. No. 14/588,871, Non Final Office Action dated Jun. 29, 2015", 13 pgs.
"U.S. Appl. No. 14/588,871, Non Final Office Action dated Sep. 9, 2016", 12 pgs.
"U.S. Appl. No. 14/588,871, Non Final Office Action dated Sep. 15, 2016", 16 pgs.
"U.S. Appl. No. 14/588,871, Preliminary Amendment filed Jan. 27, 2015", 8 pgs.
"U.S. Appl. No. 14/588,871, Response filed Jan. 17, 2017 to Non Final Office Action dated Sep. 15, 2016", 20 pgs.
"U.S. Appl. No. 14/588,871, Response filed May 31, 2017 to Final Office Action dated Mar. 31, 2017", 19 pgs.
"U.S. Appl. No. 14/588,871, Response filed Jul. 7, 2016 Final Office Action dated Mar. 7, 2016", 12 pgs.
"U.S. Appl. No. 14/588,871, Response filed Oct. 29, 2015 to Non Final Office Action dated Jun. 29, 2015", 11 pgs.
"Australian Application Serial No. 2011299221, Response filed Jan. 15, 2015", 19 pgs.
"Australian Application Serial No. 2011299234, Amendment filed Aug. 25, 2015", 26 pgs.
"Australian Application Serial No. 2011299234, First Examiner Report dated Aug. 25, 2014", 3 pgs.
"Australian Application Serial No. 2011299234, Response filed Oct. 26, 2015 to Subsequent Examiners Report dated Sep. 4, 2015", 3 pgs.
"Australian Application Serial No. 2011299234, Subsequent Examiners Report dated Sep. 4, 2015", 4 pgs.
"Australian Application Serial No. 2016201377, First Examiner Report dated Feb. 1, 2017",3 pgs.
"Australian Application Serial No. 2016201377, Response filed May 25, 2017 to First Examiner Report dated Feb. 1, 2017", 55 pgs.
"Australian Serial No. 2011299221, First Examiner Report dated May 2, 2014", 3 pgs.
"Brazilian Application Serial No. BR1120130055251, Voluntary Amendment filed Sep. 8, 2014", 7 pgs.
"European Application Serial No. 11824132.2, Extended European Search Report dated Feb. 25, 2014", 6 pgs.
"European Application Serial No. 11824132.2, Response filed Aug. 29, 2014", 12 pgs.
"U.S. Appl. No. 14/588,871, Notice of Allowance dated Jun. 26, 2017", 5 pgs.
"U.S. Appl. No. 14/588,871, Supplemental Notice of Allowability dated Jul. 17, 2017", 2 pgs.
"Australian Application Serial No. 2016201377, Subsequent Examiners Report dated Jun. 6, 2017", 3 pgs.
"Canadian Application Serial No. 2,810,511, Office Action dated Jun. 21, 2017", 4 pgs.
"Canadian Application Serial No. 2,810,521, Office Action dated Jun. 8, 2017", 3 pgs.
"Canadian Application Serial No. 2,810,521, Office Action dated Mar. 1, 2018", 5 pgs.
"U.S. Appl. No. 12/877,993, Amendment with Request to Reopen Prosecution filed Jul. 7, 2017", 18 pgs.
"U.S. Appl. No. 12/877,993, Non Final Office Action dated Dec. 15, 2017", 36 pgs.
"U.S. Appl. No. 14/588,871, Notice of Allowance dated Sep. 12, 2017", 2 pgs.
"U.S. Appl. No. 15/637,561, Preliminary Amendment filed Oct. 5, 2017", 7 pgs.
"U.S. Appl. No. 15/726,102, Preliminary Amendment filed Oct. 6, 2017", 7 pgs.
"Australian Application Serial No. 2016201377, Response filed Aug. 9, 2017 to Subsequent Examiners Report dated Jun. 6, 2017", 2 pgs.
"Australian Application Serial No. 2016201377, Subsequent Examiners Report dated Aug. 23, 2017", 3 pgs.
"Canadian Application Serial No. 2,810,511, Response filed Dec. 15, 2017 to Office Action dated Jun. 21, 2017", 37 pgs.
"Canadian Application Serial No. 2,810,521, Response filed Sep. 7, 2017 to Office Action dated Jun. 8, 2017", 15 pgs.
"U.S. Appl. No. 12/877,993, Examiner Interview Summary dated Mar. 19, 2018", 3 pgs.
"U.S. Appl. No. 12/877,993, Final Office Action dated Jul. 9, 2018", 37 pgs.

(56) References Cited

OTHER PUBLICATIONS

"U.S. Appl. No. 12/877,993, Response filed Mar. 15, 2018 to Non Final Office Action dated Dec. 15, 2017", 25 pgs.
"U.S. Appl. No. 15/637,561, Non Final Office Action dated Apr. 23, 2018", 22 pgs.
"U.S. Appl. No. 15/726,102, Non Final Office Action dated Apr. 18, 2018", 32 pgs.
"Canadian Application Serial No. 2,810,511, Office Action dated Jun. 12, 2018", 4 pgs.
"Canadian Application Serial No. 2,810,511, Response filed Aug. 24, 2018 to Office Action dated Jun. 12, 2018", 26 pgs.
"Canadian Application Serial No. 2,810,521, Response filed Jul. 30, 2018 to Office Action dated Mar. 1, 2018", 17 pgs.
"U.S. Appl. No. 15/637,561, Response filed Jul. 23, 2018 to Non Final Office Action dated Apr. 23, 2018", 11 pgs.
"Canadian Application Serial No. 2,810,511, Office Action dated Dec. 10, 2018", 5 pgs.
"U.S. Appl. No. 15/637,561, Final Office Action dated Nov. 26, 2018", 20 pgs.

\* cited by examiner

COLLECTING DATA FROM DIFFERENT SOURCES

RELATED APPLICATIONS

This application is a Continuation-in-Part of U.S. application Ser. No. 12/877,034, filed on Sep. 7, 2010, which is incorporated herein by reference in its entirety.

TECHNICAL FIELD

This application relates to the fields of media and entertainment and specifically to method and system for aggregating data collected from different sources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system is described to collect information from a great number of viewers' client devices, determine a list of popular content items based on the collected information, customize the list for a particular viewer, and send that list to the viewer's device. This approach to aiding a viewer in making choices in the universe of viewable content may be termed a smart playlist system. Example embodiments described herein provide systems and methods to generate a smart play list. For the purposes of this description, the term viewer will be understood to include actual viewers, as well as potential viewers, e.g., persons that may at some point in time view a video program.

In one embodiment, a smart playlist system obtains from viewers' client devices content-related information such as, e.g., which programs are being currently viewed, which programs are being recorded and scheduled to be recorded, which content has been rated and the associated ratings, as well as recommendations pertaining to programs, purchases of various programs, etc. For the purposes of this description the terms content, content item, show, and program will be understood to denote viewable content. Data collected indiscriminately from the entire accessible community of viewers may be accumulated in a repository termed a global bucket. Data from the global bucket may be analyzed to determine programs that appear to be most popular at the time of the analyzing, i.e., appear to be of heightened interest to viewers. A certain number of programs that have been determined as most popular are compiled into a so-called hot list. The hot list may be made available to viewer, e.g., by communicating the list to the viewers' client devices or providing an access link that can be invoked from the users' devices.

Before a hot list is provided to a viewer, it may be personalized for the viewer by determining how relevant the items in the hot list are to that particular viewer and presenting to the viewer only those programs that have been determined to be of high relevance to the viewer. The relevancy of a particular program to a particular viewer may be determined by associating each item in the hot list with a score based on the viewer's profile, on the viewer's content viewing history and patterns, as well as based on information collected from the client devices of a subset of viewers who are members of the particular viewer's social network.

In one example embodiment, in addition to determining a personalized hot list of content items, a smart playlist system may trigger recording of a certain program as soon as the program has been identified as a live program and of high relevance to the viewer. For example, a viewer may not be tuned into a channel broadcasting a particular live sports event. If the smart playlist system determined that the live sports event is of high relevance to the viewer, the smart playlist system may trigger the recording of the live broadcast of the sports event on the viewer's client device (e.g., a set top box, a desktop computer, etc.) and also alerts the user to the fact that she may be interested in the event being currently broadcast on a certain channel. The viewer may then ignore the alert. If the viewer, instead, tunes to the suggested channel the viewer would not have missed the beginning of the broadcast because the recording of the program has been automatically triggered by an instruction provided to the viewer's client device from the smart playlist system. In one example, the high relevancy of the live broadcast may have been determined based on the fact that all of the viewer's social network contacts have either tuned into the associated channel or have scheduled the recording of the broadcast. In another example, the high relevancy of the live broadcast may have been determined based on the viewer's profile or on the viewer's viewing history. An example smart playlist system may be implemented within architecture illustrated in FIG. 1.

Figure 1:
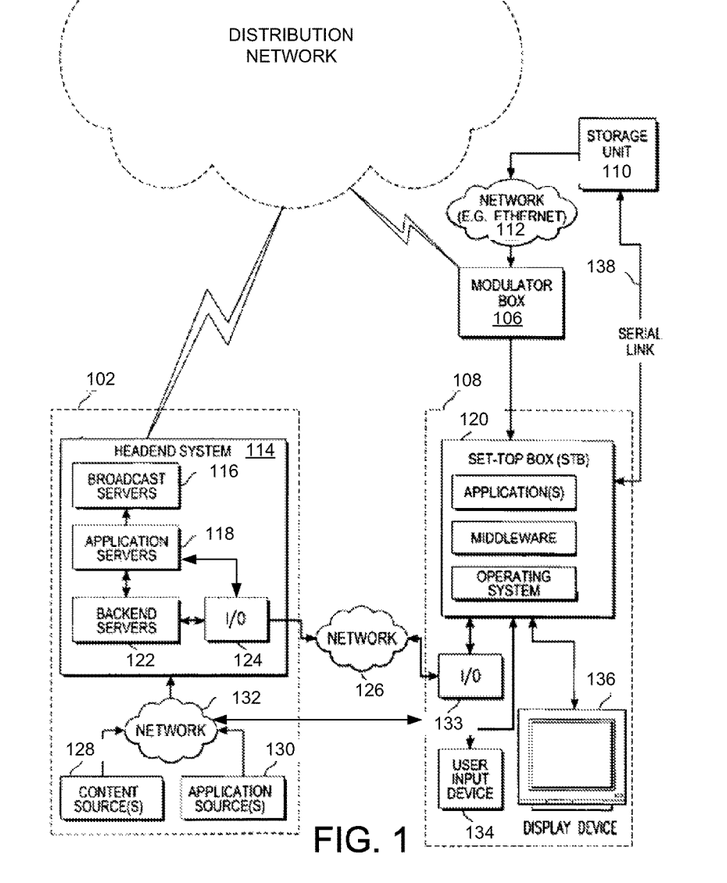
FIG. 1 illustrates an environment within which an example smart playlist may be implemented, in accordance with an example embodiment.

FIG. 1 illustrates network architecture of an example interactive media environment 100 wherein some embodiments of the present invention may be deployed. The interactive media environment 100 includes a source system 102 that communicates data (e.g., media content data and interactive application data) via a distribution network or system 104 (e.g., the Internet, a mobile communication network, or any other network capable of communicating digital data) and a modulator box 106 to a receiver system 108. In one example embodiment, the interactive media environment 100 optionally includes a storage unit 110 (e.g., personal computer) that communicates stored data via a network 112 to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with a local stored data provided by the storage unit 110 provided at the user's home.

Turning first to the source system 102, an example headend system 114 operates to communicate the data as a broadcast transmission. To this end, the headend system 114 is shown to include one or more broadcast servers 116 and, optionally, one or more application servers 118. Each of the broadcast servers 116 may operate to receive, encode, packetize, multiplex, modulate, and broadcast data from various sources and of various types. While the example embodiment is described herein as transmitting data from the headend system 114 as a broadcast, it will be appreciated that the relevant data could also be unicast or multicast from the source system 102 via the distribution system 104 and modulator box 106 to the receiver system 108. In various embodiments, data could also be transmitted from the source system 102 via a network connection to the receiver system 108. Further, in other example embodiments the source system 102 may be modified to facilitate communications via the Internet, a mobile phone network, or any other network capable of communicating digital data.

Each application server 118, in one example embodiment, compiles and provides interactive data modules to the broadcast server 116. The interactive data modules may also include data that is utilized by an interactive television application. The application server 118 may also include multiplexing functionality to enable multiplexing of, for example, interactive television applications and associated data with audio and video signals received from various sources. The application server 118 may also have the capability to feed (e.g., stream) multiple interactive television applications to one or more broadcast servers 116 for distribution to the receiver system 108. To this end, each application server 118 may implement a so-called "carousel," whereby code and data modules are provided to a broadcast server 116 in a cyclic, repetitive manner for inclusion within a transmission from the headend system 114. In other embodiments, code may reside permanently in a set-top box (STB) 120 (e.g., the code may be stored in non-volatile memory of the STB 120), may be pushed of downloaded to the STB 120, or be provided to the STB 120 in any other manner. In one embodiment, the application server 118 provides a smart playlist mechanism to collect information from viewers, determine a list of popular content items, customizing the list for a particular user and sending that lit to the user's device. The smart playlist mechanism will be discussed by way of example in more detail in connection with FIGS. 2-4.

The headend system 114 is also shown, by way of example, to include one or more backend servers 122, which are coupled to the application servers 118 and to an input/output device 124 (e.g., a modem pool). Specifically, the I/O device 124 is coupled to receive data from the receiver system 108 via a network 126 (e.g., the Internet) and to provide this data to backend servers 122. The backend servers 122 may then provide the data, received from the receiver system 108, to the application servers 118 and the broadcast servers 116. Alternatively, data received from the receiver system 108 may be directly provided to the application servers 118.

Accordingly, the network 126 and the I/O device 126 may operate as a return channel whereby the receiver system 108 is provided with interactivity with the source system 102. Data provided to the headend system 114 via the return channel may include, merely for example, user input to an interactive media application executed at the receiver system 108 or data that is generated by the receiver system 108 and communicated to the source system 102. The return channel may also provide a channel whereby programs, targeted advertisements/commercials, and applications from the source system 102 are provided to the receiver system 108.

Within the source system 102, the headend system 114 is also shown optionally to receive data (e.g., content, code, and application data) from external sources. For example, the headend system 114 may be coupled to one or more content sources 128 and one or more application sources 130 via a network 132 (e.g., the Internet). For example, a content source 128 may be a provider of entertainment content (e.g., movie), a provider of real-time dynamic data (e.g., weather information), and the like. The application source 130 may be a provider of any interactive media application. For example, one or more application sources 130 may provide a TV media player application, electronic program guide and navigation applications, messaging and communication applications, information applications, and so forth. The application sources 130 may be configured to execute on different client devices (e.g., mobile phones, personal computer, STBs, or the like).

Turning now to the example distribution system 104, the distribution system 104 may, in one embodiment, support the broadcast distribution of data from the source system 102 to the receiver system 108. As shown, the distribution network or system 104 may comprise a satellite, cable, terrestrial or Digital Subscribers Line (DSL) network, or any other data communication network or combination of such networks.

The receiver system 108 is shown, in one example embodiment, to include the set-top box (STB) 120 that receives data (e.g., primary and secondary content streams) via the distribution system 104 and modulator box 106 and an input/output device 132 (e.g., modem) for return channel communications with the headend system 114. The receiver system 108 is also shown to include other optional external systems such as a user input device 134 (e.g., a keyboard, remote control, mouse etc.) and a display device 136, coupled to the set-top box 120, for the display of content received at the set-top box 120. In one example embodiment, the display device 136 may be a television set.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the set-top box 120 and communicated to the storage unit 110 over a link 138.

It will be appreciated to one skilled in the art that one or more of the modules, applications, or the like of the modulator box 106, the set-top box 120, and the storage unit 110 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein. While the interactive media environment 100 is illustrated having a receiving system 108 including a set-top box 120, it is noted that the receiving system 108 may comprise a mobile device or a personal computer coupled to a network for receiving media.

Smart playlist may be utilized beneficially in the context of a network environment. FIG. 1 illustrates an environment 100 within which an example smart playlist may be implemented. The environment 100 includes a set top box 110 in communication with an entertainment display device 120 and a control device 130. The set-top box (STB) 110 may be a device that connects to a television and an external source of signal, turning the signal into content which can then be displayed on the television screen. In one example embodiment, the entertainment display device 120 is a television set, and the control device 130 is a remote control device that may be used for switching between television channels, for example. The set-top box 110 may be configured to include a system 112 to provide a smart playlist that may include features outlined above. The set-top box 110 may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. Content, in this context, could mean any or all of video, audio, Internet web pages, interactive games, or other possibilities. As shown in FIG. 1, the set-top box 110 is shown as having access to signal sources 140, including broadcast programming 142, video on demand programs 144, as well as to local content 146 and Internet content 148.

Figure 2:
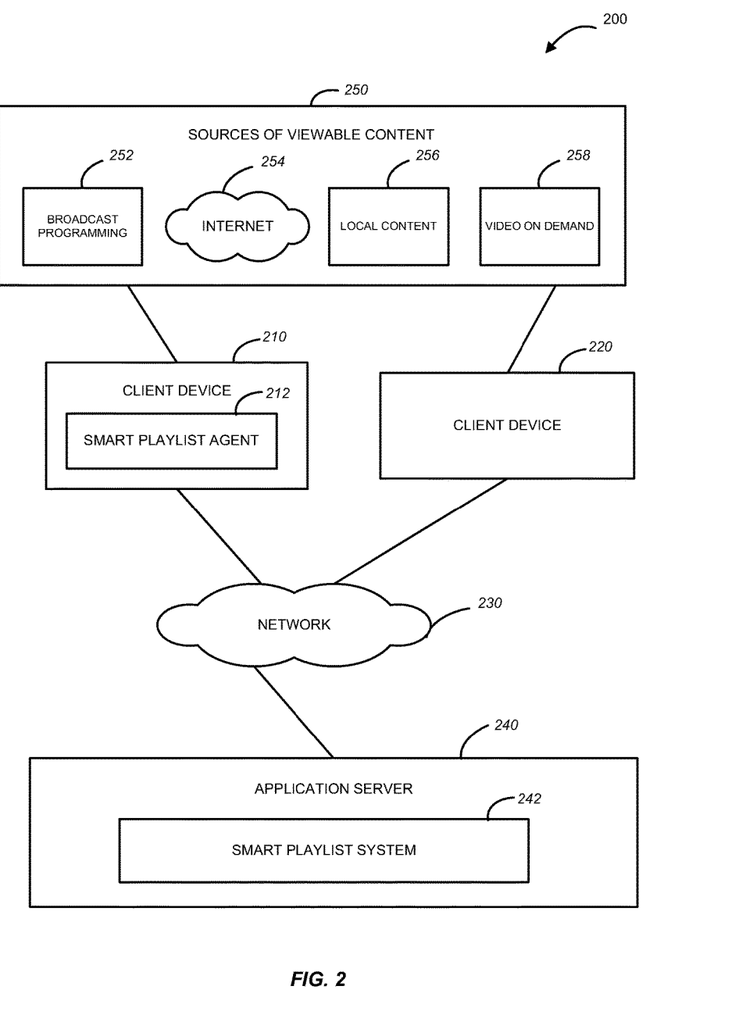
FIG. 2 is a network diagram illustrating architecture within which a smart playlist may be utilized, in accordance with an example embodiment.

FIG. 2 is a network diagram illustrating architecture 200 within which a smart playlist may be utilized, in accordance with an example embodiment. The architecture 100 includes a client device 210 and a client device 220, each configured to receive content from content sources 250 and to be in communication with a server system 240 via a communications network 230. The client devices 210 and 220 may be set top boxes, desktop computers, mobile devices, etc. The communications network 230 may be a public network (e.g., the Internet, a wireless network, etc.) or a private network (e.g., a local area network (LAN), a wide area network (WAN), Intranet, etc.). The server 240 may include a smart playlist system 242 configured to collect information related to utilization of viewable content from viewers' client devices, to aggregate and customize the collected information, and to provide the resulting hot list to viewers personalized for each particular user, as was described above.

The client device 210 may be configured to include a smart playlist agent 212 that may be configured to cooperate with the smart playlist system 242 with respect to collecting information regarding viewable content accessed or referenced on the client device 210. In some embodiments, the smart playlist system 242 may be configured to obtain information regarding viewable content accessed or referenced on a client device without the use of a smart playlist agent. As shown in FIG. 2, the client devices 210 and 220 have access to signal sources 250. The signal sources 250 include broadcast programming 252, video on demand programs 254, as well as to local content 256 and Internet content 258.

In one embodiment, the smart playlist system 242 may be configured to collect content-related data from different sources in addition to client devices. For example, he playlist system 242 may be configured to collect content-related data from systems providing on-line social communities, systems providing search engines, systems of providers of video-on-demand, system of providers of content for purchase or rent, etc. The collected data may be weighted according to its source (e.g., in analyzing the collected data to generate a smart playlist data collected from a certain on-line blog server may be weighted lower than data collected from a video-on-demand provider system). An example architecture, within which data collected from different sources may be processed utilizing smart playlist system (also referred to as a recommendation engine) may be described with reference to FIG. 3.

Figure 3:
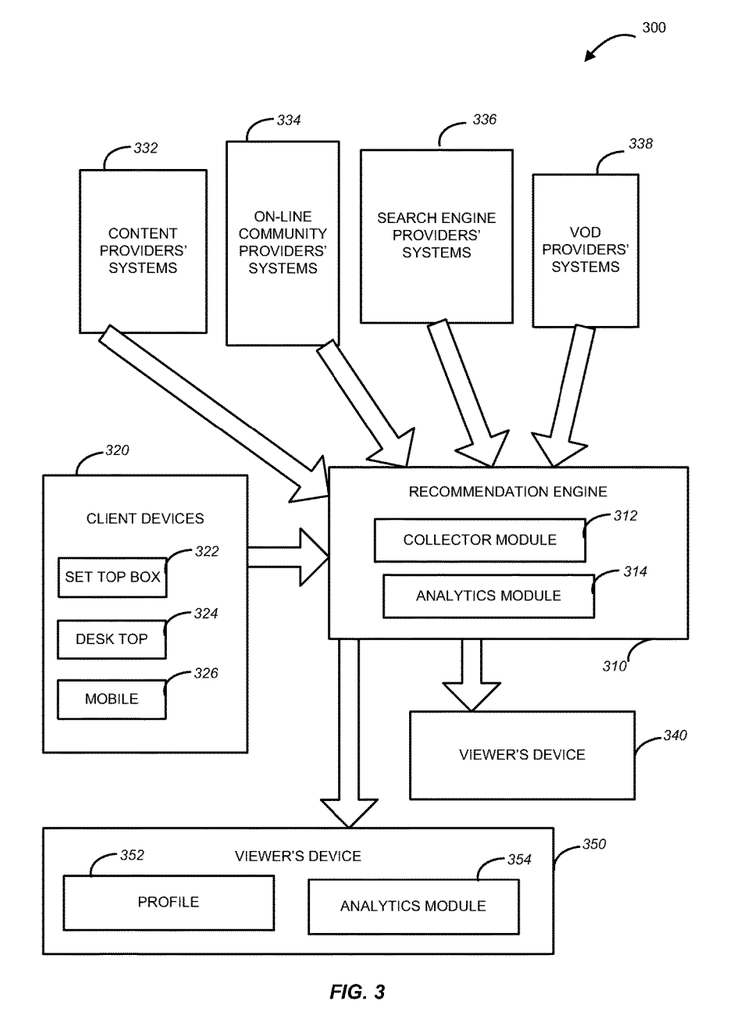
FIG. 3 is an example architecture within which data collected from different sources may be processed utilizing a recommendation engine, in accordance with an example embodiment.

FIG. 3 illustrates architecture 300 comprising a recommendation engine 310 that, in one embodiment, may reside on the application server 240 of FIG. 2 and may correspond to the smart playlist system 242 or it may be hosted on some other computer system or be distributed across multiple computers or computer systems. The recommendation engine 310 may be configured to use a collector module 312 to obtain content-related information from different sources such as, e.g., content providers' systems 332, on-line community providers' systems 334, search engine providers' systems 336 web searching services, video-on demand providers' systems 338, a system providing an electronic programming guide, etc. The term "system" will be understood to include one or more computer modules provided on a computer or distributed across multiple computers or computer systems. The content providers' systems 332 may include one or more server computers hosting a video-sharing website. The on-line community providers' systems 334 may include one or more server computers hosting a social networking website or a microblogging service. The video-on demand providers' systems 338 may include one or more server computers hosting a rental-by-mail and video streaming services. The collector module 312 provided with the recommendation engine 310 may be also configured to obtain content-related information from client devices 320, such as a set top box 322, a desk top computer 324, a mobile device 326, etc.

Content-related data, which may include viewership information, changes in viewership (e.g., a sudden spike in the number of users trending about a video program or a dramatic increase in the number of viewers watching or recording a video program), ratings of content, references to content items in on-line publications, rental and purchasing information, etc., may be processed by the analytics module 314 to identify those content items that appear to be of heightened interest to viewers. An indication of the heightened interest (also referred to as popularity) may be expressed in terms of a popularity value, which may be calculated for a content item (e.g., a video program) based on, cumulatively, the total number of viewers currently watching or recording the video program being above a predetermined threshold value, the total number of viewers currently watching or recording the video program having increased by a certain percent as compared to the earlier measurement, the number of times the video program has been referenced in microblogs or on-line social network news feeds, etc. The recommendation engine 310 may be configured to generate a list of popular content items, where a popular item is associated with a popularity value above a certain threshold value, customize the lists respectively for viewers associated with viewer devices 340 and 350, and provide the customized lists to the viewer devices 340 and 350. Customization process is described in further detail with reference to FIG. 4 below.

Prior to customizing the list of popular content items for a specific viewer, the recommendation engine 310 may apply to the list a preliminary filter configured to filter the list based on characteristics of various groups of users. Such preliminary filtering may be based on geographic location or demographics of a group of users. In one embodiment, the viewer's device 350 may host an analytics module 354 that may be configured to receive content-related data from the recommendation engine 310 and used the received data to generate recommendations, e.g., using profile data stored in a profile repository 352. An example system to generate a smart playlist (e.g., a customized list of popular items) may be described with reference to FIG. 4.

Figure 4:
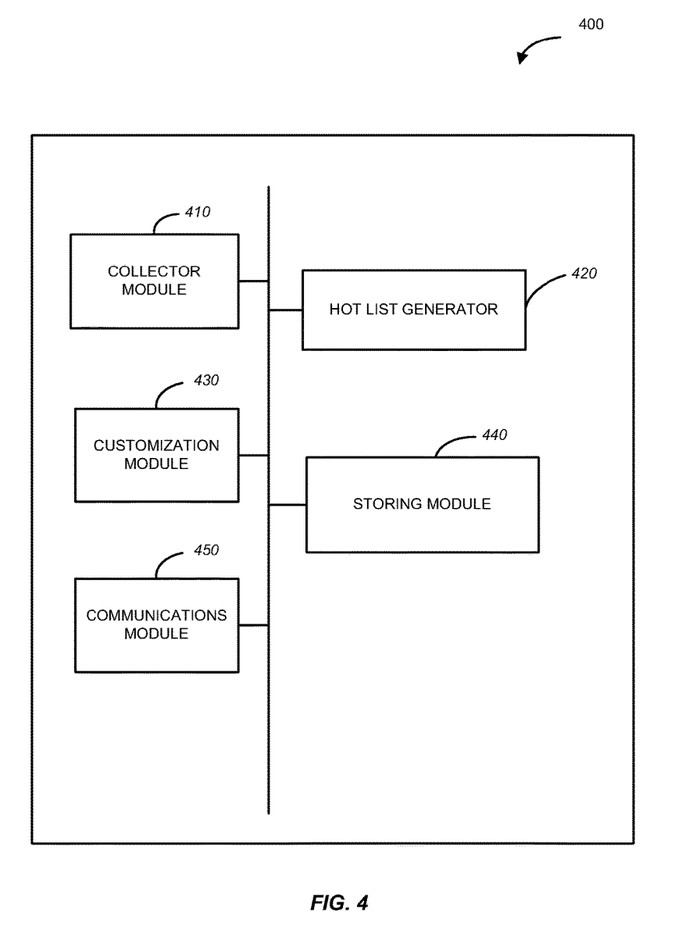
FIG. 4 is a block diagram illustrating a smart playlist system, in accordance with an example embodiment.

FIG. 4 illustrates an example system 400 to generate a smart playlist based on content utilization information collected from client devices of the entire community of users that can be accessed by the smart playlist system. The system 400, which may correspond to the recommendation engine 410 of FIG. 4 or a smart playlist system 240 of FIG. 2, includes a collector module 410, a hot list generator 420, a customization module 440, and a communications module 450. The collector module 410 may be configured to obtain content utilization data from a plurality of client devices (e.g., the client devices 210 and 220 of FIG. 2. The content utilization data for a viewer from the plurality of viewers may be indicative of the viewer's interest in respective content items. In one embodiment, the collector module 410 obtains content utilization data from a real time listener provided at a client device, e.g., the smart playlist agent 212 of FIG. 2. The hot list generator 420 may be configured to generate a list of popular content items based on the obtained content utilization data.

The collector module 410 obtains content utilization information from all client devices accessible to the smart playlist system 400. This information, collected from the entire universe of viewers that have diverse tastes, viewing habits, and content source preferences and that reflects content utilization of the entire viewing community, is stored, by a storing module 440, in a repository termed a global bucket. The data from the global bucket is analyzed by the hot list generator 420 to determine those content items that are of most interest to the global community of viewers and assemble those content items into a list of popular items, a so-called hot list. In one embodiment, the hot list generator 420 may generate a hot list based on how many viewers are watching or recording a show, the duration of the watching, ratings and recommendations associated with the program, and so on. As the collector module 410 continuously obtains content utilization data from client devices, the hot list generator 420 may be configured to continuously update the hot list, e.g., once a day or based on any predetermined time period.

The customization module 440 may be configured to customize the hot list that is generated based on the information from the global bucket that reflect preferences of the entire community of viewers to target more closely the actual and projected preferences of a particular viewer (a target viewer) and generate a so-called customized playlist. The customizing may be based on the viewer's profile that may be stored at the application server 240 of FIG. 2, as well as on the viewing history of the viewer and the viewing history of members of the viewer's social network. In one embodiment, the storing module 440 stores content utilization data for individual viewers in respective repositories termed personal buckets. A viewer's profile stored at the application server 240 may indicate that one or more other viewers are associated with the viewers as "friends" in terms of social networking. The storing module 440 stores content utilization data collected from client devices of the viewer's "friends" or social connections in a repository termed a social bucket. The customization module 440 may utilize data from the viewer's personal bucket and the viewer's social bucket to generate the customized playlist. The customization module 440 may be configured to periodically update the customized playlist, e.g., based on the changes in the hot list, based on the changes in the data stored in the personal bucket and the social bucket, as well as based on the changes in the viewer's profile.

In one embodiment, a customized playlist is generated by generating a score for each item from the list of popular content items and including items into in the customized playlist based on respective scores of the items from the list of popular content items. The scoring may be based on the viewer's preferences identified in the viewer's profile, based on data from the viewer's personal bucket and the viewer's social bucket. A content item from a category that is not indicated in the viewer's profile as being of interest to the viewer and that is not considered as being of interest to the viewer based on the viewing history of the viewer may still be assigned a high score by the customization module 440 based on the information from the viewers social bucket. For example, the customization module 440 may be configured to weigh heavily an indication that a certain content item is of high interest to a great number of the viewer's social contacts.

The communications module 450 may be configured to communicate the customized playlist to a client device of the target viewer. The communications module 450 may be configured to communicate to the client device an instruction to start recording of a live program identified in the customized playlist. The communications module 450 may also be configured to communicate to the client device an instruction to display an alert message regarding of a live program identified in the customized playlist. As mentioned above, a client device may be a set top box, a desktop computer, or a mobile device. Content items referenced in the hot list or in the customized playlist may be associated with a variety of content sources, such as, e.g., the Internet, video on demand, and live broadcast. Example operations performed by the system 400 may be described with reference to FIG. 5.

Figure 5:
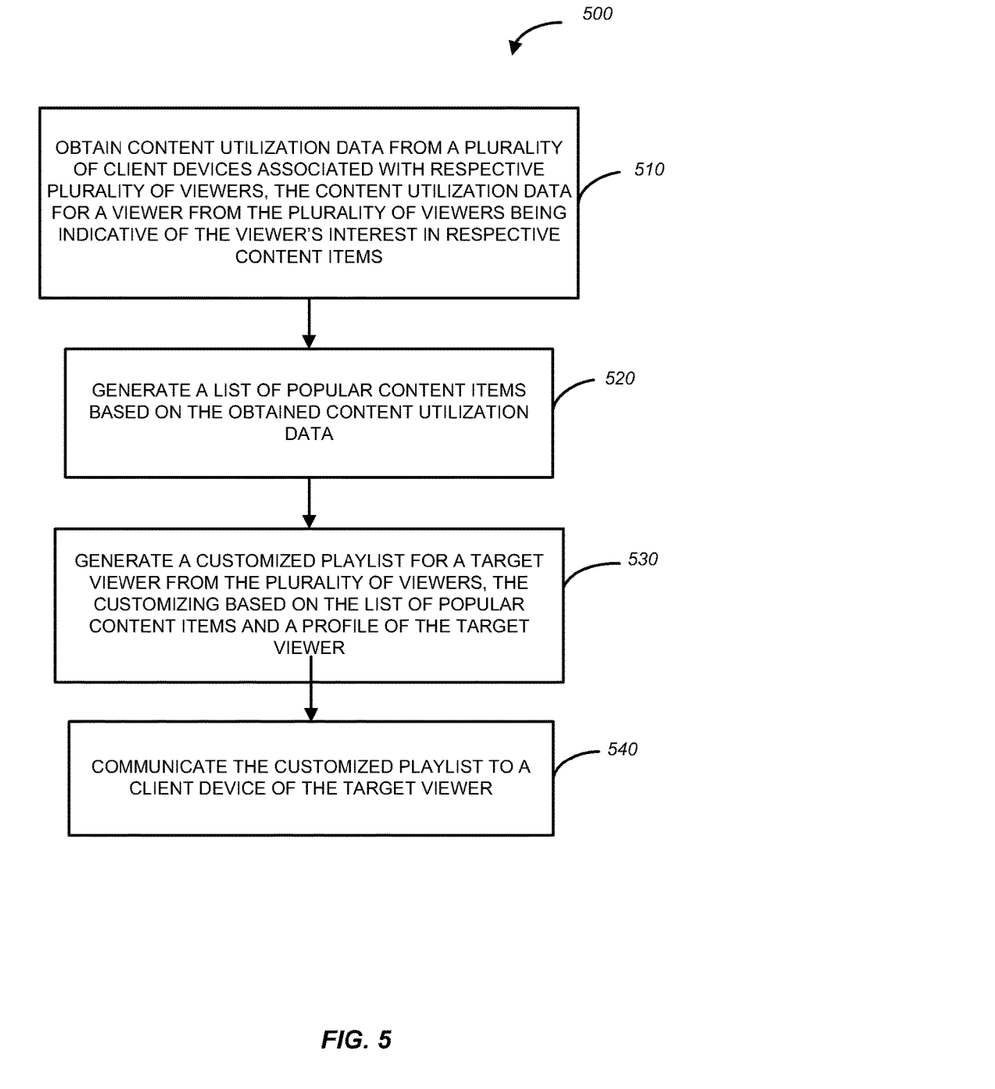
FIG. 5 is a flow chart illustrating a method for providing a smart playlist to a viewer's client device, in accordance with an example embodiment.

FIG. 5 illustrates an example method 500 of providing a smart playlist. The method 500 may be performed in the context of media and entertainment, e.g., in the context of television entertainment. The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 3 or FIG. 4.

As shown in FIG. 5, the method 500 commences with operation 510, where the collector module 410 of FIG. 4 obtains content utilization data from a plurality of client devices associated with respective plurality of viewers. At operation 520, the hot list generator 420 of FIG. 4 generates a list of popular content items based on the obtained content utilization data. At operation 540, the customization module 440 of FIG. 4 generates a customized playlist for a target viewer from the plurality of viewers, based on the list of popular content items and a profile of the target viewer. At operation 540, the communications module 440 of FIG. 4 communicates the customized playlist to a client device of the target viewer.

Figure 6:
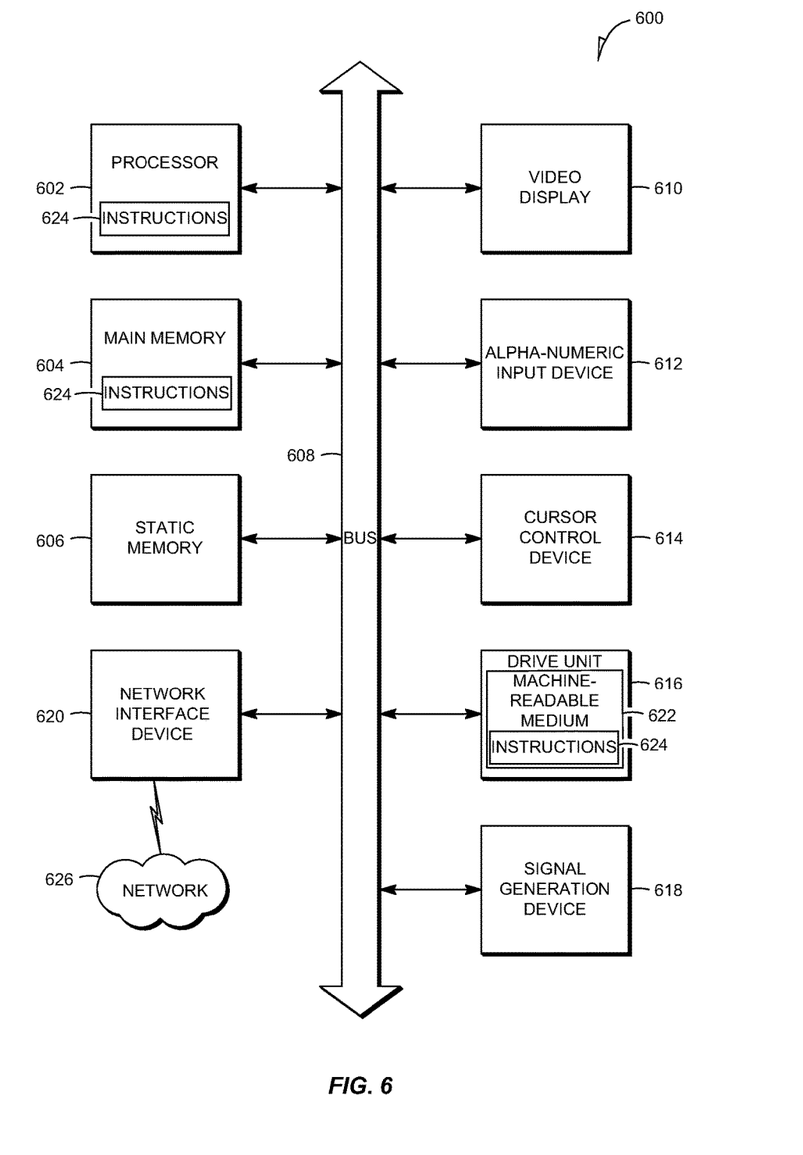
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a real or virtual keyboard), a viewer interface (UI) navigation device 614 (e.g., a remote control or a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604, within the processor 602 during execution thereof by the computer system 600, the main memory 604 and the processor 602 also constituting machine-readable media. The main memory 604 comprises storage locations that are addressable by the processor 602 for storing software program code. The memory may comprise a form of random access memory (RAM). Those skilled in the art will appreciate that other memory means, such as FLASH memory media, may also be used for storing the program instructions and data structures shown in the main memory 604.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, method and system to collect content-related data from multiple source computer systems have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any user that may potentially view viewable content at any point in time.

The invention claimed is:

1. A computer-implemented method comprising:
receiving, at a server computer system, first content-related data from a first computer system of a first provider system, the first content-related data being indicative of first viewership information for one or more in first content items;
receiving, at the server computer system, second content-related data from a second computer system of a second provider system, the second content-related data being indicative of second viewership information for one or more second content items, wherein the first computer system is distinct from the second computer system, and wherein the first provider system is distinct from the second provider system;
calculating, by the server computer system, for each content item in a set of content items a popularity value of the content item, the calculating of each popularity value comprising:
generating third viewership information by applying a first weight value to the first viewership information and applying a second weight value to the second viewership information;
accessing a change in viewership of the content item based on the third viewership information and a reference viewership information of the content item; and
comparing the change in viewership of the content item to a predetermined threshold;
automatically generating, by the server computer system, based on the calculated popularity value for each content item in the set of content items, third content-related data comprising information identifying currently popular content items in the set of content items, wherein the currently popular content items are identified based on the popularity value for each of the currently popular content items satisfying a predetermined threshold value;
generating, by the server computer system, playlist data for a target viewer, the playlist data identifying one or more content items in the set of content items, the one or more content items identified based on at least one content preference identified in a viewer profile of the target viewer; and
based on generating the playlist data, automatically sending, by the server computer system, to a client device of the target viewer, an instruction that causes the client device to perform an operation for a content item in the one or more content items identified in the playlist data.

2. The method of claim 1, wherein the first provider system comprises a web search engine provider's system.

3. The method of claim 1, wherein the first provider system comprises a social network provider's system.

4. The method of claim 1, wherein the first provider system comprises a video-on-demand provider's system.

5. The method of claim 1, wherein the first provider system comprises a viewer's client device.

6. The method of claim 5, wherein the viewer's client device is a set top box.

7. The method of claim 5, wherein the viewer's client device is a desktop computer.

8. The method of claim 5, wherein the viewer's client device is a mobile device.

9. A computer-implemented system comprising:
one or more hardware processors; and
a memory storing instructions that, when executed by at least one of the one or more hardware processors, causes the one or more hardware processors to perform operations comprising:
receiving first content-related data from a first computer system of a first provider system, the first content-related data being indicative of first viewership information for one or more first content items;
receiving second content-related data from a second computer system of a second provider system, the second content-related data being indicative of second viewership information for one or more second content items, wherein the first computer system is distinct from the second computer system, and wherein the first provider system is distinct from the second provider system;
calculating, for each content item in a set of content items a popularity value of the content item, the calculating of each popularity value comprising:
generating third viewership information by applying a first weight value to the first viewership information and applying a second weight value to the second viewership information;
accessing a change in viewership of the content item based on the third viewership information and a reference viewership information of the content item; and
comparing the change in viewership of the content item to a predetermined threshold;
automatically generating, based on the calculated popularity value for each content item in the set of content items, third content-related data comprising information identifying currently popular content items in the set of content items, wherein the currently popular content items are identified based on the popularity value for each of the currently popular content items satisfying a predetermined threshold value;
generating playlist data for a target viewer, the playlist data identifying one or more content items in the set of content items, the one or more content items identified based on at least one content preference identified in a viewer profile of the target viewer; and
based on generating the playlist data, automatically sending, to a client device of the target viewer, an instruction that causes the client device to perform an operation for a content item in the one or more content items identified in the playlist data.

10. The computer-implemented system of claim 9, wherein the first provider system comprises a web search engine provider's system.

11. The computer-implemented system of claim 9, wherein the first provider system comprises a social network provider's system.

12. The computer-implemented system of claim 9, wherein the first provider system comprises a video-on-demand provider's system.

13. The computer-implemented system of claim 9, wherein the first provider system comprises a viewer's client device.

14. The computer-implemented system of claim 13, wherein the viewer's client device is a mobile device.

15. A machine-readable non-transitory storage medium storing instructions that, when executed by at least one hardware processor of a machine, cause the machine to perform operations comprising:

receiving first content-related data from a first computer system of a first provider system, the first content-related data being indicative of first viewership information for one or more first content items;

receiving second content-related data from a second computer system of a second provider system, the second content-related data being indicative of second viewership information for one or more second content items, wherein the first computer system is distinct from the second computer system, and wherein the first provider system is distinct from the second provider system;

calculating, for each content item in a set of content items a popularity value of the content item, the calculating of each popularity value comprising:
  generating third viewership information by applying a first weight value to the first viewership information and applying a second weight value to the second viewership information;
  accessing a change in viewership of the content item based on the third viewership information and a reference viewership information of the content item; and
  comparing the change in viewership of the content item to a predetermined threshold;

automatically generating, based on the calculated popularity value for each content item in the set of content items, third content-related data comprising information identifying currently popular content items in the set of content items, wherein the currently popular content items are identified based on the popularity value for each of the currently popular content items satisfying a predetermined threshold value;

generating playlist data for a target viewer, the playlist data identifying one or more content items in the set of content items, the one or more content items identified based on at least one content preference identified in a viewer profile of the target viewer; and based on generating the playlist data, automatically sending, to a client device of the target viewer, an instruction that causes the client device to perform an operation for a content item in the one or more content items identified in the playlist data.

16. The method of claim 1, the first content-related data comprising data describing ratings of the respective first content items.

17. The method of claim 1, the first content-related data comprising data describing a number of the first viewers currently watching or recording each of the respective first content items.

18. The method of claim 1, the first content-related data comprising data describing changes in a number of the first viewers currently watching or recording at least one of the respective first content items.

19. The method of claim 1, the first content-related data comprising data describing a number of references to the respective first content items in online media sources.

20. The method of claim 1, the at least one content preference comprising a preference of the target viewer for a particular content category.

21. The computer-implemented method of claim 1, wherein the instruction that causes the client device to perform the operation for the content item causes the client device to generate an alert for the content item.

22. The computer-implemented method of claim 18, wherein:
  the calculating, for each of the respective content items, the popularity value based on the content-related data comprises:
    accessing a percentage increase of a total number of viewers currently watching the content item; and
    comparing the percentage increase to a predetermined percentage.

23. The computer-implemented method of claim 1, wherein the first content items comprise broadcast programs.

24. The computer-implemented method of claim 1, wherein the first content items comprise video on demand programs.

25. The computer-implemented method of claim 1, wherein the first content items comprise Internet content.

* * * * *